(12) United States Patent
Hasegawa

(10) Patent No.: US 10,576,788 B2
(45) Date of Patent: Mar. 3, 2020

(54) TIRE

(71) Applicant: BRIDGESTONE CORPORATION, Tokyo (JP)

(72) Inventor: Tomoo Hasegawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 302 days.

(21) Appl. No.: 15/126,883

(22) PCT Filed: Jan. 14, 2015

(86) PCT No.: PCT/JP2015/000140
§ 371 (c)(1),
(2) Date: Sep. 16, 2016

(87) PCT Pub. No.: WO2015/141108
PCT Pub. Date: Sep. 24, 2015

(65) Prior Publication Data
US 2017/0087940 A1    Mar. 30, 2017

(30) Foreign Application Priority Data

Mar. 20, 2014 (JP) .................................. 2014-058728

(51) Int. Cl.
*B60C 11/03* (2006.01)

(52) U.S. Cl.
CPC ....... *B60C 11/0302* (2013.01); *B60C 11/0311* (2013.01); *B60C 2011/036* (2013.01);
(Continued)

(58) Field of Classification Search
CPC ............. B60C 11/0302; B60C 11/0311; B60C 2011/0344; B60C 2011/0313;
(Continued)

(56) References Cited

U.S. PATENT DOCUMENTS 2,592,557 A * 4/1952 Gibbs ................. B60C 11/0311
152/209.12
3,000,421 A * 9/1961 Hack ................... B60C 11/0302
152/209.12
(Continued)

FOREIGN PATENT DOCUMENTS

CN       204526668 U    8/2015
EP       1 775 144 A1   4/2007
(Continued)

OTHER PUBLICATIONS

Apr. 14, 2015 International Search Report issued in International Patent Application No. PCT/JP2015/000140.

*Primary Examiner* — Eric Hug
(74) *Attorney, Agent, or Firm* — Oliff PLC

(57) ABSTRACT

A tire with improved uneven wear resistance has a designated tire rotation direction and includes inclined grooves in both halves of the tread surface divided by the tire equatorial plane, the inclined grooves extending inward in the tire width direction from the tread surface edge side, being inclined opposite the tire rotation direction, and being aligned in the tire circumferential direction; and an inter-inclined-groove land portion formed between each pair of inclined grooves that are adjacent in the tire circumferential direction. Along a land portion edge of the inter-inclined-groove land portion on the tire rotation direction side thereof, a point P1 located ¾ of the tread half-width from the tire equatorial plane in the tire width direction is positioned on the tire rotation direction side of a point P2 located ¼ of the tread half-width from the tire equatorial plane in the tire width direction.

2 Claims, 5 Drawing Sheets

(52) U.S. Cl.
CPC ............... *B60C 2011/0313* (2013.01); *B60C 2011/0344* (2013.01); *B60C 2011/0365* (2013.01); *B60C 2011/0381* (2013.01); *B60C 2011/0388* (2013.01); *B60C 2200/065* (2013.01); *B60C 2200/14* (2013.01)

(58) Field of Classification Search
CPC .......... B60C 2200/14; B60C 2200/065; B60C 2011/0365; B60C 2011/036; B60C 2011/0388; B60C 2011/0381
USPC .................................................. 162/209.12
See application file for complete search history.

(56) References Cited

U.S. PATENT DOCUMENTS

| | | | | |
|---|---|---|---|---|
| 4,202,391 A | * | 5/1980 | Shibayama | B60C 11/0311 152/209.12 |
| 4,254,811 A | * | 3/1981 | Devaux | B60C 11/00 152/209.18 |
| 2008/0289738 A1 | * | 11/2008 | Nakamura | B60C 11/0311 152/209.24 |
| 2012/0118461 A1 | * | 5/2012 | Matsuzawa | B60C 11/0311 152/209.18 |
| 2014/0110026 A1 | * | 4/2014 | Koyanagi | B60C 11/0302 152/209.21 |
| 2015/0007918 A1 | * | 1/2015 | Hironaka | B60C 11/0316 152/209.16 |

FOREIGN PATENT DOCUMENTS

| | | | | |
|---|---|---|---|---|
| EP | 2 732 984 A1 | | 5/2014 | |
| EP | 2 818 333 A1 | | 12/2014 | |
| JP | 2007-055385 A | | 3/2007 | |
| JP | 2012-179948 | * | 9/2012 | ....... B60C 2200/065 |
| JP | 2012-179948 A | | 9/2012 | |
| JP | 2013-022967 A | | 2/2013 | |
| JP | 2013-159321 A | | 8/2013 | |
| WO | WO 2013/008478 | * | 1/2013 | ......... B60C 11/0302 |
| WO | WO 2013/125246 | * | 8/2013 | ......... B60C 11/0316 |

* cited by examiner

TIRE

TECHNICAL FIELD

This disclosure relates to a tire.

BACKGROUND

Tires for construction and mining vehicles are mounted on dump trucks and other construction vehicles used at construction sites and mines. Such tires have the problem of uneven wear, for example wear that progresses at the shoulder region and wear that progresses near a point located ½ of the tread half-width from the tread surface edge of the tread portion (referred to below as the "¼ point").

A pneumatic tire for construction vehicles that addresses the problem of uneven wear has been proposed, for example in WO 2006/013758 (PTL 1). In this tire, lug grooves that cut across the land portion at the shoulder side of the tread portion are provided in both halves of the tread surface. Specifically, in this pneumatic tire, the groove width of each lug groove gradually decreases, and each lug groove includes a tapered groove portion with a tip extending beyond ½ of the tread half width from the tread surface edge. According to this tire, providing a tapered portion in the lug groove reportedly keeps the tread rubber from deforming in the tire width direction and being dragged against the road surface when the tread surface kicks off the road surface, and the occurrence of uneven wear near the ¼ point of the tread surface can reportedly be prevented.

CITATION LIST

Patent Literature

PTL 1: WO 2006/013758

SUMMARY

Technical Problem

With a pneumatic tire such as the one in PTL 1, the problem of uneven wear near the ¼ point due to slipping at the road surface caused by deformation of the tread rubber in the tire width direction can be somewhat improved, but uneven wear cannot be sufficiently reduced. Generally, wear progresses in tires because a shear force is applied, dragging the tread surface at the shoulder region along the road surface in the tire rotation direction, due to the radius of the central region of the tread portion being greater than the radius of the shoulder region. Such wear, however, is not taken into consideration in the aforementioned conventional technique.

It would therefore be helpful to provide a tire that improves uneven wear resistance.

Solution to Problem

A tire according to this disclosure has a designated tire rotation direction and comprises: a plurality of inclined grooves in both halves of a tread surface divided by a tire equatorial plane, the inclined grooves extending inward in a tire width direction from a tread surface edge side, being inclined in an opposite direction from the tire rotation direction, and being aligned in a tire circumferential direction; and an inter-inclined-groove land portion formed between each pair of inclined grooves that are adjacent in the tire circumferential direction; wherein along a land portion edge of the inter-inclined-groove land portion on the tire rotation direction side thereof, a point P1 located ¾ of a tread half-width from the tire equatorial plane in the tire width direction is positioned on the tire rotation direction side of a point P2 located ¼ of the tread half-width from the tire equatorial plane in the tire width direction.

According to this disclosure, the inter-inclined-groove land portion contacts the ground from the shoulder region of the tread portion, thereby improving the uneven wear resistance of the tire.

In this disclosure, the "tire rotation direction" refers to one of the two directions along the tire circumferential direction and is the direction in which the tire rotates when the tire is mounted on a vehicle and the vehicle moves forward.

Furthermore, in this disclosure, the "tread surface" refers to the entire outer circumferential surface of the tire that comes into contact with the road surface when the tire is attached to an applicable rim, filled to a prescribed internal pressure, and rolled while being placed under a load corresponding to the maximum load capability.

The "applicable rim" is a valid industrial standard for the region in which the tire is produced or used and refers to a Standard Rim (or "Measuring Rim," "Design Rim") of an applicable size as described in the YEAR BOOK by the Japan Automobile Tyre Manufacturers Association (JATMA) in Japan, the STANDARDS MANUAL by the European Tyre and Rim Technical Organisation (ETRTO) in Europe, the YEAR BOOK by the TIRE AND RIM ASSOCIATION INC. (TRA) in the United States of America, and the like. A state in which a tire attached to an applicable rim is "filled to a prescribed internal pressure" refers to a state in which the tire is mounted on the aforementioned applicable rim, and air pressure corresponding to the maximum load capability of a single wheel (maximum air pressure) at the applicable size and ply rating, as described by JATMA or another organization, is applied. The air mentioned here may be replaced with an inactive gas such as nitrogen gas and the like.

In this disclosure, the "tread surface edge" refers to the outermost position of the tread surface in the tread width direction.

Furthermore, in this disclosure, the "tread half width" refers to half the distance of the tread width. The "tread width" refers to the distance, in a developed view of the tread, between the tread surface edges as measured along the tire width direction.

In a tire according to this disclosure, each inclined groove preferably includes a lug groove and a narrow groove; the lug groove preferably extends from the tread surface edge inward in the tire width direction and terminates before reaching the tire equatorial plane; the narrow groove preferably extends from an inner edge, in the tire width direction, of the lug groove inward in the tire width direction; and the inner edge, in the tire width direction, of the lug groove is preferably positioned in a range of ⅛ to ⅞ of the tread half width from the tire equatorial plane along the tire width direction.

According to this structure, the heat dissipation at the tread portion of the tire and the rigidity of the inter-inclined-groove land portion can be maintained. A reduction in the heat dissipation of the tread portion leads to problems such as thermal aging of rubber due to an increase in the internal temperature of the tread portion, which could increase the probability of failure.

A tire according to this disclosure preferably further comprises a circumferential groove, in the inter-inclined-groove land portion, extending in the tire rotation direction from a lug groove, between adjacent lug grooves, on an opposite side of the inter-inclined-groove land portion from the tire rotation direction.

According to this structure, uneven wear of the shoulder region can be even further suppressed, and the heat dissipation of the tread portion can be improved.

Furthermore, in a tire according to this disclosure, the circumferential groove preferably terminates within the inter-inclined-groove land portion.

According to this structure, the rigidity of the inter-inclined-groove land portion can be maintained better than when the circumferential groove opens to both of the adjacent lug grooves.

In a tire according to this disclosure, a groove width of the narrow groove is preferably in a range of 1/150 to 1/30 of the tread half width.

According to this structure, the narrow groove closes when the tread surface contacts the road surface. Hence, the heat dissipation of the tread portion and the rigidity of the inter-inclined-groove land portion can more reliably be maintained. In this disclosure, the "groove width" of each groove refers to the width measured in a direction orthogonal to the extending direction of the groove.

A tire according to this disclosure preferably further comprises a center groove positioned on the tire equatorial plane of the tread surface and extending continuously in the tire circumferential direction.

According to this structure, the heat dissipation of the tread portion can be further improved.

A second tire according to this disclosure comprises: a center groove positioned on the tire equatorial plane of the tread surface and extending continuously in a tire circumferential direction; a plurality of inclined grooves in both halves of the tread surface divided by a tire equatorial plane, the inclined grooves extending inward in a tire width direction from a tread surface edge side, being inclined toward a first tire circumferential direction side, and being aligned in the tire circumferential direction; and an inter-inclined-groove land portion formed between each pair of inclined grooves that are adjacent in the tire circumferential direction; wherein along a land portion edge of the inter-inclined-groove land portion on a second tire circumferential direction side thereof opposite the first tire circumferential direction side, a point P3 located 3/4 of a tread half-width from the tire equatorial plane in the tire width direction is positioned on the second tire circumferential direction side of a point P4 located 1/4 of the tread half-width from the tire equatorial plane in the tire width direction; and wherein the tire further comprises a circumferential groove, in the inter-inclined-groove land portion, extending toward the second tire circumferential direction side from an inclined groove, between adjacent inclined grooves, on the first tire circumferential direction side of the inter-inclined-groove land portion.

According to this disclosure, by mounting the tire on a vehicle so that the tire rotates from the first tire circumferential direction side towards the second side, the inter-inclined-groove land portion contacts the ground from the shoulder region of the tread portion, thereby improving the uneven wear resistance of the tire.

Advantageous Effect

A tire according to this disclosure has improved uneven wear resistance.

DETAILED DESCRIPTION

Embodiments of my tire will be demonstratively described in detail with reference to the drawings.

Figure 1:
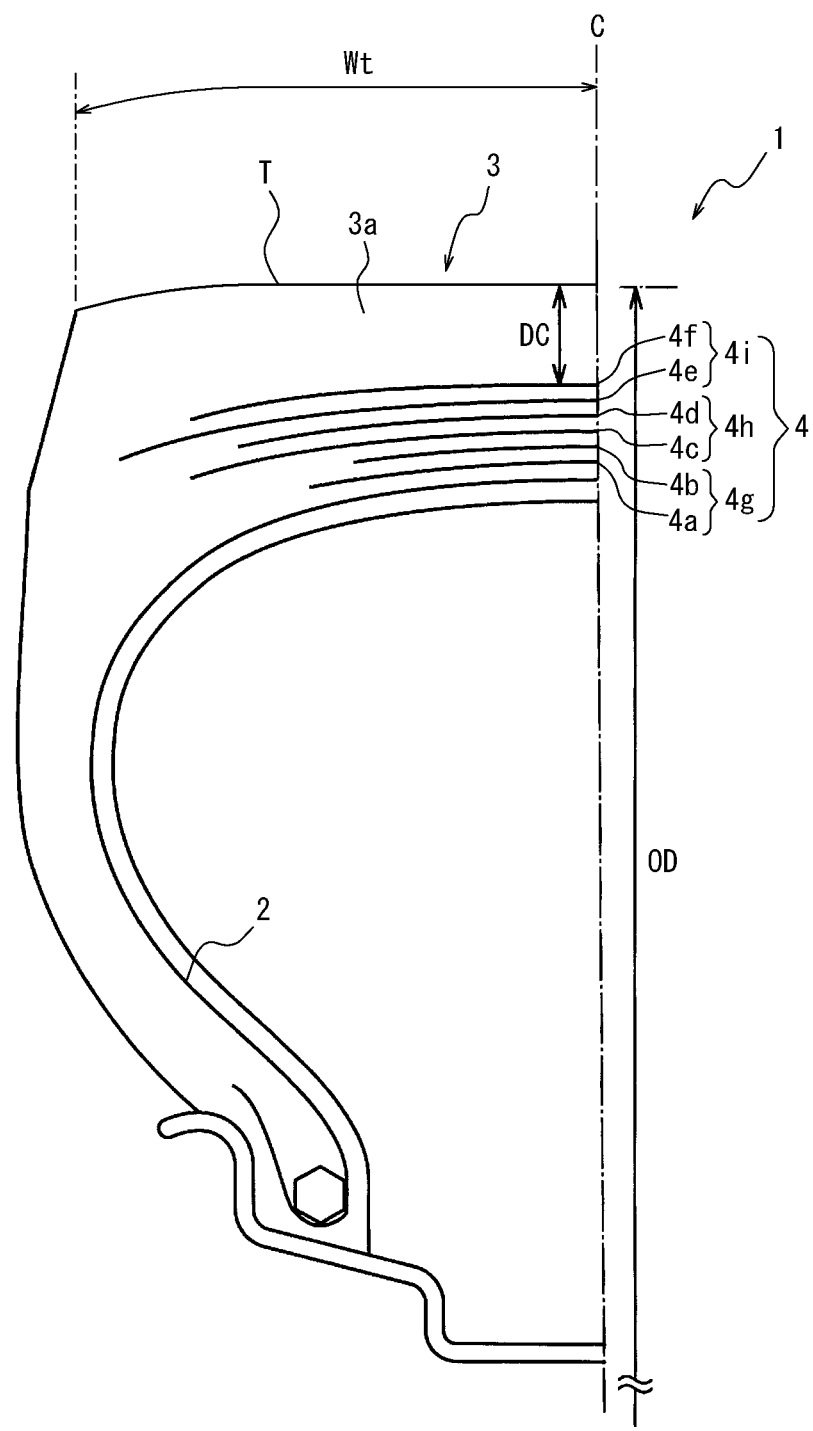
FIG. 1 is a cross-sectional diagram in the tire width direction (half portion) illustrating a tire according to Embodiment 1.

FIG. 1 is a partial cross-sectional diagram in the tire width direction illustrating a tire 1, which has a designated tire rotation direction, according to Embodiment 1. The tire 1 in FIG. 1 is, for example, a heavy-duty tire for construction vehicles and is provided with a tread portion 3, a pair of sidewall portions continuous with the sides of the tread portion 3, and a bead portion continuous with each sidewall portion. The tire 1 includes a carcass 2 that extends between bead cores embedded in the bead portions, extending toroidally across the tread portion 3, the sidewall portions, and the bead portions. A belt 4 extending in the tire circumferential direction is disposed in the tread portion 3 outward from the carcass 2 in the tire radial direction, and tread rubber 3a forming a tread surface T is disposed outward from the belt 4 in the tire radial direction. While omitted from FIG. 1, the below-described inclined grooves, circumferential grooves, and the like are provided on the tread surface.

The carcass 2 forms the frame portion of the tire 1, extends toroidally through the components as described above, and turns back from the inside to the outside in the tire radial direction so as to cover the area around the bead cores. The carcass 2 may, for example, be configured with carcass cords that are formed by steel wire and that extend in a predetermined direction. In this embodiment, the carcass cords extend along the tread width direction, i.e. the carcass 2 is a radial carcass.

The carcass 2 illustrated in FIG. 1 is formed from one ply, but in the tire 1, the number of plies in the carcass 2 may be changed to two or more as necessary.

The belt 4 may, for example, be formed by belt cords made up of steel wire. The belt cords extend at an inclination relative to a predetermined direction that is the direction in which the carcass cords of the carcass 2 extend.

The belt 4 may be configured with a plurality of belt layers. In the tire 1 of the illustrated example, the belt 4 is configured with six belt layers disposed from the inside to the outside in the tire radial direction in the order of a first belt layer 4a, a second belt layer 4b, . . . , and a sixth belt layer 4f.

In this example, the first belt layer 4a and the second belt layer 4b form an inner intersecting belt group 4g, the third belt layer 4c and the fourth belt layer 4d form an intermediate intersecting belt group 4h, and the fifth belt layer 4e and sixth belt layer 4f form an outer intersecting belt group 4i.

In the illustrated embodiment, the width of the inner intersecting belt group 4g is from 50% to 140% of the tread half-width W, the width of the intermediate intersecting belt group 4h is 110% to 180% of the tread half-width W, and the width of the outer intersecting belt group 4i is from 120% to 220% of the tread half-width W. As long as the widths of the belt layers included in each intersecting belt group is within the aforementioned ranges, the widths may be the same or differ from each other. In this embodiment, the widths of the belt layers increase in the order of the second belt layer 4b, the first belt layer 4a, the fourth belt layer 4d, the sixth belt layer 4f, the third belt layer 4c, and the fifth belt layer 4e. The second belt layer 4b has the smallest belt layer width, and the fifth belt layer 4e has the largest belt layer width. The width of each belt layer refers to the length measured along the tire width direction.

In this embodiment, in plan view of the tread, the inclination angle of the belt cords in each belt layer relative to the carcass cords is from 70° to 85° in the inner intersecting belt group 4g, from 50° to 75° in the intermediate intersecting belt group 4h, and from 50° to 70° in the outer intersecting belt group 4i.

In plan view of the tread, the inclination angle of the belt cords in each intersecting belt group relative to the carcass cords is greatest in the inner intersecting belt group 4g, and the intermediate intersecting belt group 4h has an inclination angle equal to or greater than that of the outer intersecting belt group 4i.

The angles of the belt cords in the belt layers included in each intersecting belt group may be the same or different from each other, as long as the angles are within the aforementioned ranges. The belt layers in each intersecting belt group are inclined in opposite directions from each other relative to the carcass cords.

As illustrated in FIG. 1, the tread portion 3 of the tire 1 has a thicker rubber gauge (greater rubber thickness) than a pneumatic tire mounted on a passenger vehicle or the like. Other below-described embodiments of my tire may also have the same tire structure as that of the tire 1 exemplified in FIG. 1.

Specifically, the tire 1 has a tire outer diameter OD and a rubber gauge DC of the tread portion 3 at the position of a tire equatorial plane C that satisfy the relationship DC/OD≥0.015.

The tire outer diameter OD (units: mm) refers to the diameter of the tire 1 in a portion (generally, the tread portion 3 in the vicinity of the tire equatorial plane C) where the outer diameter of the tire 1 reaches its maximum. The rubber gauge DC (units: mm) refers to the rubber thickness of the tread portion 3 at the position of the tire equatorial plane C. The thickness of the belt 4 is not included in the rubber gauge DC. In the case where a center groove is formed at a position including the tire equatorial plane C, the rubber gauge DC refers to the rubber thickness of the tread portion 3 at a position adjacent to the center groove.

In the tire 1, the structure of the carcass 2, the belt 4, and the like is not limited to the above examples, and any structure may be adopted.

Next, the tire 1 is described with reference to the partial developed view of the tread pattern in FIG. 2.

Figure 2:
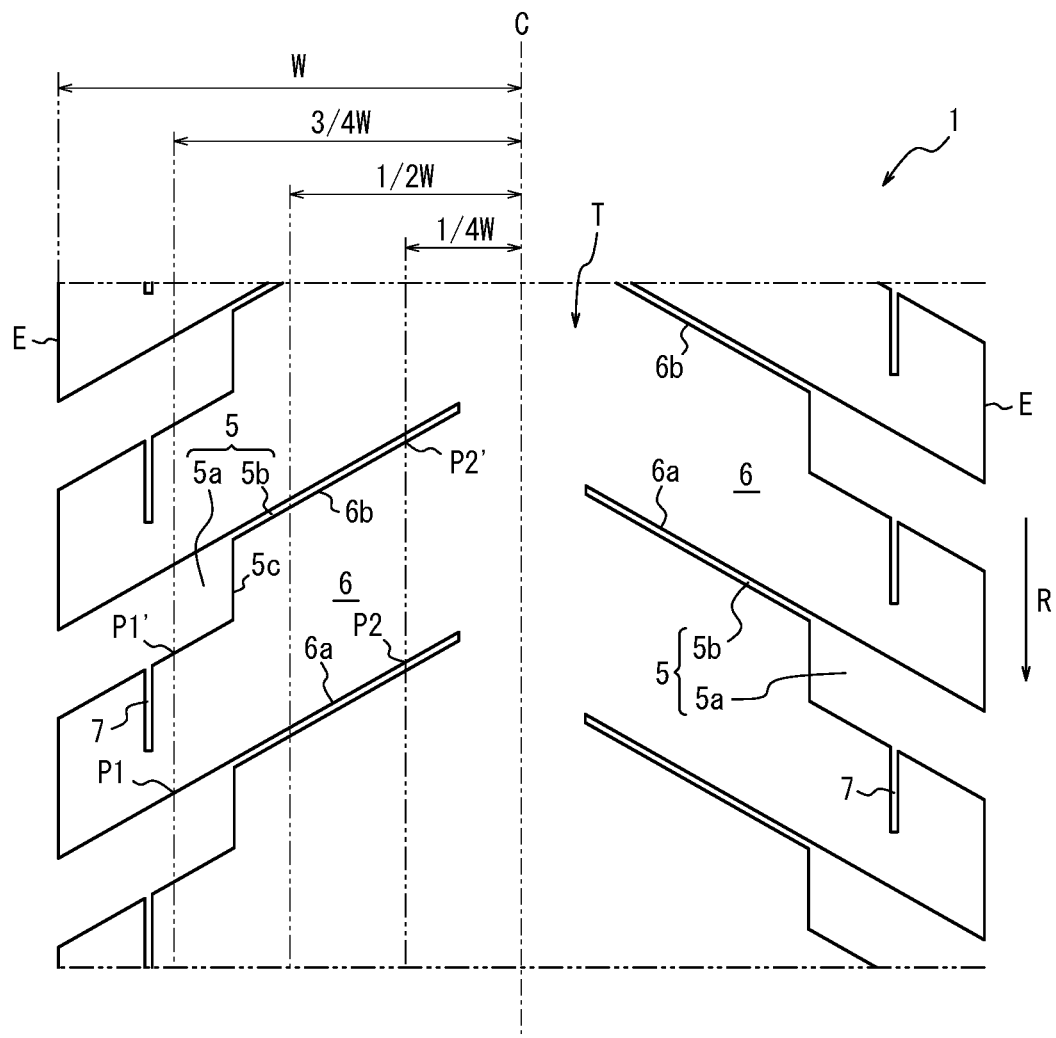
FIG. 2 is a partial developed view of a tread pattern of the tire in FIG. 1.

As illustrated in FIG. 2, the tire 1 is provided with a plurality of inclined grooves 5, in both halves of the tread surface T divided by the tire equatorial plane C, extending at an inclination relative to the tire width direction and aligned in the tire circumferential direction.

Specifically, the inclined grooves 5 extend from the tread surface edge E side inward in the tire width direction at an inclination in the opposite direction along the tire circumferential direction from the tire rotation direction R, linearly in this example, and are each formed in this example from a lug groove 5a positioned outward in the tire width direction and a narrow groove 5b positioned inward in the tire width direction. The inclined grooves 5 disposed in the halves of the tread surface T are shifted in position from each other in the tire circumferential direction, and the inclined grooves 5 disposed in each half of the tread surface T have the same form and are aligned in the tire circumferential direction so as to be parallel. Furthermore, each inclined groove 5 disposed in the halves of the tread surface T is inclined, from the tread surface edge E side to the tire equatorial plane C, in the opposite direction along the tire circumferential direction from the tire rotation direction R.

As illustrated in FIG. 2, the lug groove 5a extends from the tread surface edge E inward in the tire width direction and terminates before reaching the tire equatorial plane C.

The narrow groove 5b extends from the inner edge 5c, in the tire width direction, of the lug groove 5a inward in the tire width direction and terminates in the illustrated example before reaching the tire equatorial plane C. By the narrow groove 5b illustrated in FIG. 2 opening to the inner edge, in the tire width direction, of the lug groove 5a on the end thereof at the opposite side from the tire rotation direction R, the groove wall between the narrow groove 5b and the lug groove 5a at the opposite side from the tire rotation direction is linear.

In this tire 1, the inclined groove 5 is formed from the lug groove 5a and the narrow groove 5b, but the inclined groove 5 may instead be formed from the narrow groove alone or from the below-described lug groove alone, or may have a different shape. Furthermore, the position of each end, the length of extension, and the like may be changed freely. Whereas the lug groove 5a and the narrow groove 5b constituting the inclined groove 5 in the illustrated example extend continuously, a land portion may be provided partway through the inclined groove 5 so that the lug groove 5a and the narrow groove 5b extend intermittently in the same direction of extension. The inclined grooves 5 positioned in the two halves in FIG. 2 are shifted in the tire circumferential direction but may instead be provided at the same position in the tire circumferential direction. Furthermore, the inclined grooves 5 positioned in the two halves may be connected.

By disposing the aforementioned inclined grooves 5 in the tread surface T, the inter-inclined-groove land portions 6 are formed by being sandwiched between inclined grooves 5 that are adjacent in the tire circumferential direction, as illustrated in FIG. 2. Accordingly, each inter-inclined-groove land portion 6 includes a land portion edge 6a (also referred to below as the "kick-in end"), on the tire rotation direction side, that contacts the ground by kicking the road surface first in the tire circumferential direction when the tire 1 rotates and includes, on the opposite side in the tire circumferential direction from the kick-in end 6a, a land portion edge 6b (also referred to below as the "kick-out end"), on the opposite side from the tire rotation direction, that separates from the road surface by subsequently kicking out from the road surface in the tire circumferential direction when the tire 1 rotates. The land portion edges are the portions of the tread surface T in the land portion that are adjacent to the grooves defining the land portion.

In the tire 1, as illustrated in FIG. 2, along the kick-in end 6a, a point P1 located ¾ of the tread half-width W from the tire equatorial plane C in the tire width direction is positioned on the tire rotation direction R side of a point P2 located ¼ of the tread half-width W from the tire equatorial plane C in the tire width direction. In other words, between the point P1 and the point P2 positioned on the kick-in end 6a, the point P1 contacts the road surface before the point P2 when the tire 1 rotates.

In the tire 1, as illustrated in FIG. 2, along the kick-out end 6b as with the kick-in end 6a, a point P1' located ¾ of the tread half-width W from the tire equatorial plane C in the tire width direction is positioned on the tire rotation direction R side of a point P2' located ¼ of the tread half-width W from the tire equatorial plane C in the tire width direction. In other words, between the point P1' and the point P2' positioned on the kick-out end 6b, the point P1' separates from the road surface before the point P2'. The inter-inclined-groove land portion 6 is thus formed roughly as a parallelogram. In this disclosure, it is not essential that the point P1' on the kick-out end 6b be positioned on the tire rotation direction R side of the point P2'.

The effects of the tire 1 according to Embodiment 1 are described below.

Generally, since the radius of the central region of the tread portion is greater than the radius of the shoulder region in a tire, a difference occurs between the distance to be traveled in the central region and the distance to be traveled in the shoulder region when the tire rotates. Therefore, in order to compensate for the difference, a shear force is applied on the tread surface T by the road surface in the shoulder region, in particular near the tire circumferential region that passes through the point P1, so as to produce drag in the tire rotation direction R (the shear force being in the same direction as the force applied on the tread surface T of the tire when braking; also referred to below as the "braking shear force"). In other words, slipping occurs between the shoulder region and the road surface, producing uneven wear.

By contrast, according to the tire 1 of this disclosure, the point P1 located on the kick-in end 6a contacts the road surface before the point P2. Therefore, generation of the above-described braking shear force can be suppressed. Specifically, upon being sandwiched between the tread surface T and the belt 4, the tread rubber positioned at the kick-in end 6a is pushed into the inclined groove 5 adjacent to the kick-in end 6a, since the tread rubber is incompressible. Such deformation of the tread rubber occurs in the opposite direction from the direction in which the braking shear force is applied, thereby reducing the braking shear force. In particular, when the kick-in end 6a is inclined in the tire circumferential direction so that the point P1 located on the kick-out end 6b contacts the road surface before the point P2, as in this tire 1, then the force that pushes the tread rubber in the portion of the kick-in end 6a at the point P1 side increases, and the force that pushes the tread rubber in the portion at the point P2 side weakens, thereby causing the tread rubber near the point P1 to deform even more into the inclined groove 5. Accordingly, in this tire 1, the braking shear force decreases in the shoulder region, in particular near the tire circumferential region that passes through the point P1, and slipping at the road surface decreases, improving the uneven wear resistance.

Furthermore, wear near the point that is ½ of the tread half-width W from the tire equatorial plane C (¼ point) normally occurs due to generation of stress that attempts to deform the tread rubber near the ¼ point outward in the tire width direction at the time of ground contact. In this disclosure, however, the point P1 contacts the road surface before the point P2. Therefore, when the inter-inclined-groove land portion 6 contacts the ground, stress is generated causing the tread rubber in the inter-inclined-groove land portion 6 to deform from the outside to the inside in the tire width direction at an inclination in the opposite direction from the tire rotation direction R. Hence, the various stresses cancel each other out, reducing the wear near the ¼ point.

Accordingly, with the tire 1 of this embodiment, the uneven wear resistance can be improved.

In this embodiment, the point P1' on the kick-out end 6b is positioned on the tire rotation direction R side of the point P2'. In a tire in which the point P1' and the point P2' on the kick-out end 6b are located at the same position in the tire circumferential direction, the direction in which the braking shear force is applied in the shoulder region and the direction of deformation of the tread rubber at the kick-out end 6b into the inclined groove 5 adjacent to the kick-out end 6b are the same direction, which increases the braking shear force. By contrast, as illustrated in the drawings, forming the tire so that the point P1' on the kick-out end 6b separates from the road surface before the point P2' increases the force that pushes the tread rubber out in the portion of the kick-out end 6b at the point P2' side that separates from the road surface later due to the inclination, whereas this deformation is suppressed in the portion of the kick-out end 6b at the point P1' side that separates first. Therefore, in this tire 1, the tread rubber of the kick-out end 6b at the point P1' side where a stronger braking shear force occurs is not pushed into the inclined groove 5 as easily. As compared to the case when the point P1' and the point P2' separate simultaneously, slipping decreases in the shoulder region, in particular near the tire circumferential region that passes through the point P1, further improving the uneven wear resistance.

In this embodiment, the inclined groove 5 is formed to include the lug groove 5a and the narrow groove 5b, making the heat dissipation of the tread portion compatible with the rigidity of the land portion.

In this embodiment, the inner edge 5c, in the tire width direction, of the lug groove 5a is preferably positioned in a range of ⅛ to ⅞ (in the drawings, ⅝) of the tread half-width W from the tire equatorial plane C along the tire width direction. By positioning the inner edge 5c, in the tire width direction, of the lug groove 5a in a range of ⅛ to ½ of the tread half-width W, heat dissipation due to the lug groove 5a that has a large groove width can be guaranteed, while maintaining rigidity of the inter-inclined-groove land portion 6.

The groove width of the narrow groove 5b is preferably in a range of 1/150 to 1/30 (1/100 in the drawings) of the tread half-width W. By thus setting the groove width of the narrow groove 5b to be 1/30 or less of the tread half-width W, the narrow groove 5b closes when the tread surface T contacts the road surface, which maintains the rigidity of the inter-inclined-groove land portion 6. Furthermore, by setting the groove width of the narrow groove 5b to be 1/150 or more of the tread half-width W, the heat dissipation achieved by the narrow groove 5b can be maintained.

Figure 3A:
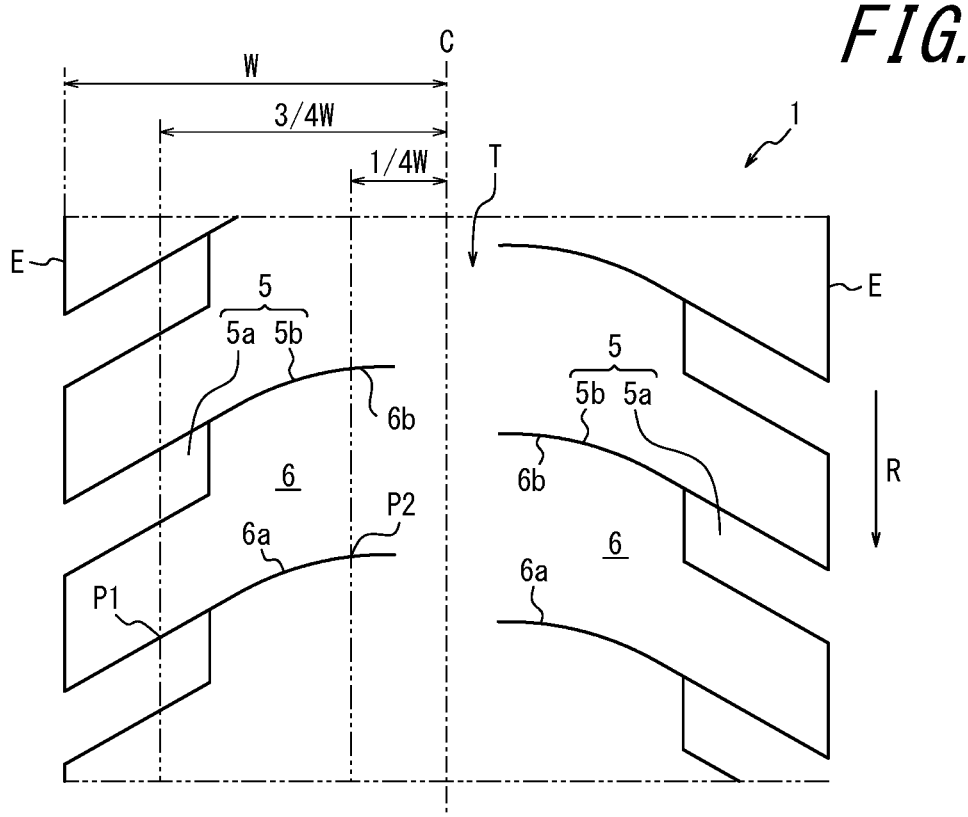
FIGS. 3A and 3B are modifications to the tread pattern of the tire in FIG. 2.
Figure 3B:
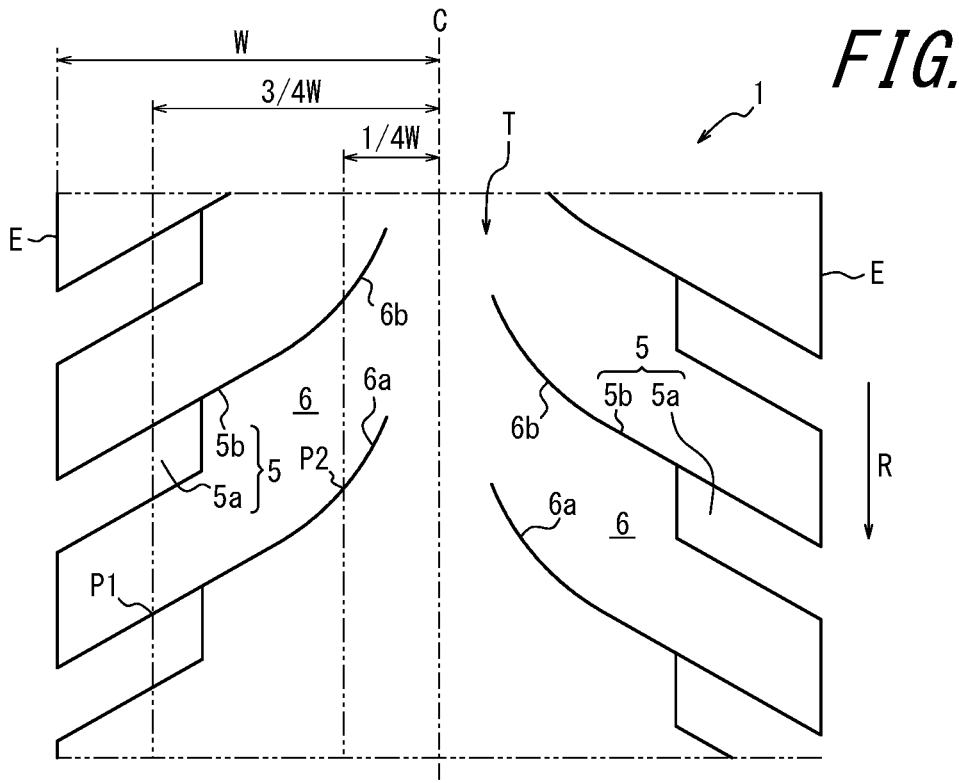

While the narrow groove 5b illustrated in FIG. 2 extends linearly, the narrow groove 5b may be formed to curve, as in FIGS. 3A and 3B. Specifically, in FIG. 3A, the narrow groove 5b curves so as to protrude towards the opposite side in the tire circumferential direction from the tire rotation direction R. According to this structure, the tire width direction rigidity of the central region of the tread portion can be improved. The inclination of the lug groove 5a of the shoulder region has a relatively greater increase than the inclination of the narrow groove 5b near the central region. Therefore, the force pushing the tread rubber at the portion on the point P1 side into the inclined groove 5 becomes even larger, which further increases the uneven wear resistance in the shoulder region.

In FIG. 3B, the narrow groove 5b curves so as to protrude towards the tire rotation direction R side. According to this structure, the tire width direction rigidity of the shoulder region of the tread portion can be improved, thereby reducing wear due to input of the side force, which is a force from the outside in the tire width direction.

In FIGS. 3A and 3B, the narrow groove 5b is shown simply as a thin outline but in fact has the same groove width as in FIG. 2. While omitted from FIGS. 3A and 3B, the below-described circumferential groove 7 may also be provided. Furthermore, in FIGS. 3A and 3B, only the narrow groove 5b is curved, but either or both of the lug groove 5a and the narrow groove 5b may be curved.

In the tire 1, as illustrated in FIG. 2, a circumferential groove 7 may be further provided in the inter-inclined-groove land portion 6. The circumferential groove 7 extends in the tire rotation direction R from a lug groove 5a, between adjacent lug grooves 5a, on the opposite side of the inter-inclined-groove land portion 6 from the tire rotation direction R. According to this structure, the heat dissipation of the tread portion can be improved. By the point P1 on the kick-in end 6a being positioned on the tire rotation direction R side of the point P2, the tread rubber near the point P1 deforms so as to be pushed into the inclined groove 5 adjacent to the point P1, but when the circumferential groove 7 is disposed outward in the tire width direction from the point P1, the inter-inclined-groove land portion 6 is partitioned inward in the tire width direction by the circumferential groove 7, thereby increasing the aforementioned deformation of the tread rubber near the point P1. As a result, the uneven wear of the shoulder region can be further suppressed.

The circumferential groove 7 preferably terminates within the inter-inclined-groove land portion 6. In other words, the circumferential groove 7 preferably does not open into either of the adjacent lug grooves 5a. According to this structure, the rigidity of the inter-inclined-groove land portion 6 can be maintained better than when the circumferential groove 7 opens to both of the adjacent lug grooves 5a.

In the tire 1 illustrated in FIG. 2, no groove extending in the tire circumferential direction is disposed in the central region of the tread surface T, but a center groove positioned on the tire equatorial plane C of the tread surface T and extending continuously in the tire circumferential direction is preferably provided. By providing the center groove, the heat dissipation of the tread portion 3 can be improved. Furthermore, when the tire 1 rolls, the tread rubber deforms from the outside toward the inside in the tire width direction if the point P1 contacts the road surface before the point P2, or if the point P1' separates from the road surface before the point P2'. At this time, the deformation of the tread rubber in each half portion differs if the tire is provided with a camber angle or if the road surface is tilted, but by providing the center groove, the mutual effects of tread rubber deformation can be blocked between tire halves, and wear resistance can be improved.

While omitted from the drawing, in the inter-inclined-groove land portion 6 illustrated in FIG. 2, a groove that extends in the tire circumferential direction and opens to inclined grooves 5 adjacent in the tire circumferential direction may be provided. This groove partitions the inter-inclined-groove land portion 6 into an outer land portion on the tire width direction outer side and an inner land portion on the inner side.

In this case, in the outer land portion, a point at the tread ground contact edge E of the kick-in end 6a of the inclined groove 5 is preferably positioned on the tire rotation direction R side of other points on the kick-in end 6a, and/or a point at the tread ground contact edge E of the kick-out end 6b of the inclined groove 5 is preferably positioned on the tire rotation direction R side of other points on the kick-out end 6b. Even when the inter-inclined-groove land portion 6 is partitioned, the tread ground contact edge E side of the outer land portion tends to experience the braking shear force and uneven wear more than the inner side of the outer land portion in the tire width direction, but according to this structure, the point at the tread ground contact edge E on the kick-in end 6a contacts the road surface first, and/or the point at the tread ground contact edge E on the kick-out end 6b separates from the road surface first, whereby the wear resistance at the outer land portion can be improved.

When the inter-inclined-groove land portion 6 is defined into an outer land portion and an inner land portion, then in the inner land portion, the point that is furthest on the tire equatorial plane C side of the kick-in end 6a of the inclined groove 5 is preferably positioned on the opposite side from the tire rotation direction R side in the tire circumferential direction relative to the other points on the kick-in end 6a, and/or the point that is furthest on the tire equatorial plane C side of the kick-out end 6b of the inclined groove 5 is preferably positioned on the opposite side from the tire rotation direction R side in the tire circumferential direction relative to the other points on the kick-out end 6b. Even when the inter-inclined-groove land portion 6 is partitioned, the tire equatorial plane C side of the inner land portion tends to experience a driving shear force (a shear force produced in the opposite direction from the braking shear force) and experience uneven wear more than the outer side of the inner land portion in the tire width direction, but according to this structure, the point at the tire equatorial plane C side on the kick-in end 6a contacts the road surface last, and/or the point at the tire equatorial plane C side on the kick-out end 6b separates from the road surface last. Therefore, a braking shear force that cancels the driving shear force is produced at the tire equatorial plane C side, and the wear resistance at the inner land portion can be improved.

Next, a tire 11 according to Embodiment 2 is described with reference to FIGS. 4A to 4C. Description of the structure that is similar to that of Embodiment 1 is omitted.

Figure 4A:
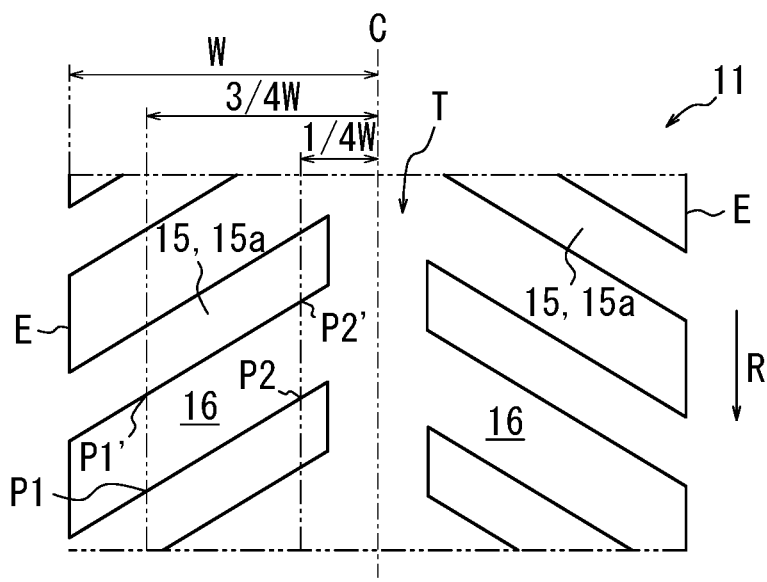
FIG. 4A is a partial developed view of the tread pattern of a tire according to Embodiment 2.
Figure 4B:
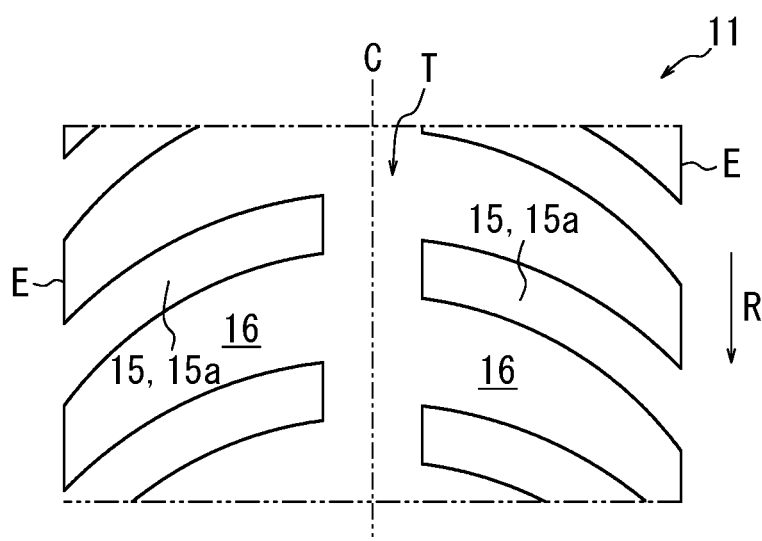
FIGS. 4B and 4C are modifications to the tread pattern in FIG. 4A.
Figure 4C:
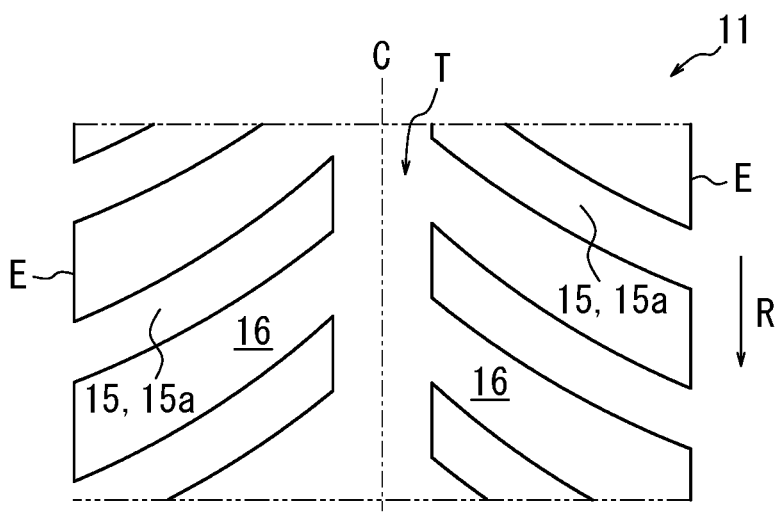

Like the tire 1 illustrated in FIG. 2, the tire 11 illustrated in FIGS. 4A to 4C includes inclined grooves 15. The tire 11 illustrated in FIGS. 4A to 4C, however, differs from the tire 1 illustrated in FIG. 2 in that the inclined grooves 15 are each formed by a lug groove 15a that does not include the narrow groove 5b illustrated in FIG. 2. According to the tire 11, the heat dissipation of the tread portion can be further improved, since the inclined groove 15 is constituted by the lug groove 15a.

The lug groove 15a illustrated in FIG. 4A extends linearly, but like the narrow groove 5b according to Embodiment 1 illustrated in FIG. 2, the lug groove 15a may be curved so as to protrude towards the opposite side in the tire circumferential direction from the tire rotation direction R as illustrated in FIG. 4B, or so as to protrude towards the tire rotation direction R side as illustrated in FIG. 4C.

Next, a tire 21 according to Embodiment 3 is described with reference to FIG. 5. Description of the structure that is similar to that of Embodiment 1 is omitted.

Figure 5:
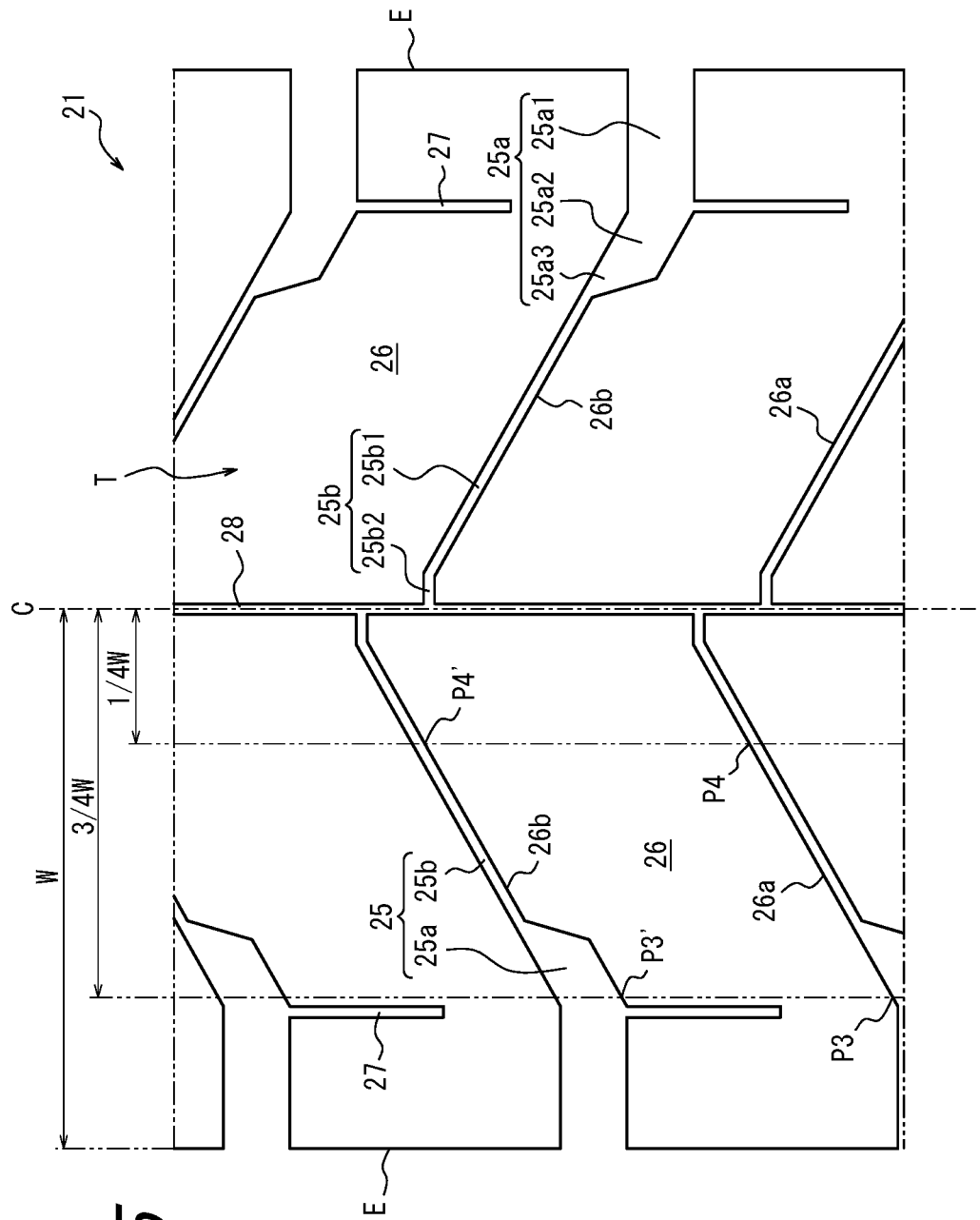
FIG. 5 is a partial developed view of a tread pattern of a tire according to Embodiment 3.

Like the tire 1 illustrated in FIG. 2, the tire 21 illustrated in FIG. 5 includes inclined grooves 25. The tire 21 in FIG. 5, however, differs from the tire 1 in FIG. 2 in that the tire 21 does not have a designated tire rotation direction, and in that a center groove 28 positioned on the tire equatorial plane C of the tread surface T and extending continuously in the tire circumferential direction is provided.

Specifically, the inclined grooves 25 are inclined toward a first tire circumferential direction side (the upper side in FIG. 5), outward in the tire width direction from the tread surface edge E side. When an inter-inclined-groove land portion 26 is formed by being sandwiched between inclined grooves 25, and the land portion edge of the inter-inclined-groove land portion 26 on a second tire circumferential direction side thereof (the lower side in FIG. 5) is a second-side land portion edge 26a, then on the second-side land portion edge 26a, a point P3 located ¾ of the tread half-width W from the tire equatorial plane C in the tire width direction is positioned on the second tire circumferential direction side of a point P4 located ¼ of the tread half-width W from the tire equatorial plane C in the tire width direction. In the inter-inclined-groove land portion 26, a circumferential groove 27 like the circumferential groove 7 in FIG. 2 is provided and extends toward the second tire circumferential direction side from an inclined groove 25, between adjacent inclined grooves 25 (lug grooves 25a in FIG. 5), on the first tire circumferential direction side of the inter-inclined-groove land portion 26.

Accordingly, by mounting the tire 21 of Embodiment 3 on a vehicle so that the tire 21 rotates from the first tire circumferential direction side towards the second side, the point P3 contacts the road surface before the point P4 does when the tire 21 rotates. Therefore, the tire 21 contacts the ground from the shoulder region of the tread portion, and uneven wear can be prevented in the shoulder region, in particular near the tire circumferential direction region that passes through the point P3. When the tire 21 of this disclosure is mounted on a vehicle so that the tire 21 rotates from the second tire circumferential direction side towards the first side, then the point P4 separates from the road surface before the point P3 at the time the tire 21 rotates. Hence, the tread rubber deforms from the inside to the outside in the tire width direction, but transmission of this deformation further outward in the tire width direction can be suppressed by the circumferential groove 27, and therefore uneven wear can be suppressed.

According to the tire 21, heat dissipation can also be improved by providing the center groove 28. Furthermore, when the tire is provided with a camber angle or when the road surface is tilted, the deformation of the rubber differs in each half portion when the tire 21 rotates, but with the tire 21, the mutual effects of rubber deformation can be blocked between tire halves.

In the tire 21 of this embodiment, as illustrated in FIG. 5, each inclined groove 25 is formed by a lug groove 25a positioned outward in the tire width direction and a narrow groove 25b positioned inward in the tire width direction. The inclined grooves 25 disposed in the halves of the tread surface T are shifted in position from each other in the tire circumferential direction, and the inclined grooves 25 disposed in each half of the tread surface T have the same form and are aligned in the tire circumferential direction so as to be parallel. Furthermore, each inclined groove 25 disposed in the halves of the tread surface T is inclined, from the tread surface edge E side to the tire equatorial plane C, toward the first tire circumferential direction side. Each inclined groove 25 disposed in the halves of the tread surface T is inclined, from the tread surface edge E side to the tire equatorial plane C, from the second tire circumferential direction side toward the first side.

As illustrated in FIG. 5, the lug groove 25a is formed by a lug groove outer portion 25a1 that extends from the tire width direction outer edge that opens to the tread surface edge E inward in the tire width direction in parallel with the tire width direction; an inclined portion 25a2 that is continuous with the lug groove outer portion 25a1 and is inclined toward the first tire circumferential direction side relative to the tire width direction; and a tapered portion 25a3 that is continuous with the inclined portion 25a2, has a gradually reducing groove width, and extends to the inner edge of the lug groove 25a in the tire width direction.

The narrow groove 25b is formed by a narrow groove outer portion 25b1 that extends inward in the tire width direction from the tire width direction outer edge of the narrow groove 25b that opens to the inner edge of the lug groove 25a in the tire width direction, extending at an inclination toward the first tire circumferential direction side relative to the tire width direction and reaching a position just before the tire equatorial plane C; and a narrow groove inner portion 25b2 that is continuous with the narrow groove outer portion 25b1 and extends to the inner edge of the narrow groove 25b in the tire width direction in parallel with the tire width direction. Furthermore, the narrow groove 25b opens to the center groove 28 at the inner end thereof in the tire width direction.

The position of the groove wall on the first tire circumferential direction side is along the same line for the inclined portion 25a2, the tapered portion 25a3, and the narrow groove outer portion 25b1.

In this tire 21, the inclined groove 25 is formed from the lug groove 25a and the narrow groove 25b, but the inclined groove 25 may instead be formed from the narrow groove alone or from the lug groove alone as illustrated in FIG. 4, or may have a different shape. Furthermore, the position of each end, the length of extension, and the like may be changed freely. Whereas the lug groove 25a and the narrow groove 25b constituting the inclined groove 25 in the illustrated example extend continuously, a land portion may be provided partway through the inclined groove 25 so that the lug groove 5a and the narrow groove 5b extend intermittently in the same direction of extension. The inclined grooves 25 positioned in the two halves in FIG. 5 are shifted in the tire circumferential direction but may instead be provided at the same position in the tire circumferential direction. Furthermore, the inner edge, in the tire width direction, of the narrow groove 25b in the inclined groove 25 may be positioned in the land portion, so that the narrow groove 25b terminates in the land portion.

When the inter-inclined-groove land portion 26 is formed by being sandwiched between inclined grooves 25, and the land portion edge of the inter-inclined-groove land portion 26 on the first tire circumferential direction side thereof is a first-side land portion edge 26b, then as illustrated in FIG. 5, on the first-side land portion edge 26b, a point P3' located ¾ of the tread half-width W from the tire equatorial plane C in the tire width direction is positioned on the second tire circumferential direction side of a point P4' located ¼ of the tread half-width W from the tire equatorial plane C in the tire width direction.

According to this structure, when the tire 21 is mounted on a vehicle so that the tire 21 rotates from the first tire circumferential direction side towards the second side, then the point P3' separates from the road surface before the point P4' at the time the tire 21 rotates. Hence, the tire separates from the road surface starting with the shoulder region of the tread portion, and uneven wear can be further prevented in the shoulder region, in particular near the tire circumferential direction region that passes through the point P3. When the tire 21 of this disclosure is mounted on a vehicle so that the tire 21 rotates from the second tire circumferential direction side towards the first side, then the point P4' contacts the road surface before the point P3' at the time the tire 21 rotates. Hence, the tread rubber deforms from the inside to the outside in the tire width direction, but transmission of this deformation further outward in the tire width direction can be suppressed by the circumferential groove 27, and therefore uneven wear can be suppressed.

Furthermore, in the tire 21 according to this embodiment, the inclined groove 25 that is formed by the lug groove 25a and the narrow groove 25b may be formed by curving the narrow groove 25b like the narrow groove 5b illustrated in FIGS. 3A and 3B.

When the narrow groove 25b illustrated in FIG. 5 is curved so as to protrude towards the first tire circumferential direction side, then the tire width direction rigidity of the central region of the tread portion can be improved by mounting the tire 21 on a vehicle so that the tire 21 rotates from the first tire circumferential direction side towards the second side. Furthermore, the inclination of the lug groove 25a of the shoulder region has a relatively greater increase than the inclination of the narrow groove 25b near the central region, thereby further increasing the uneven wear resistance of the shoulder region.

When the narrow groove 25b illustrated in FIG. 5 is curved so as to protrude towards the second tire circumferential direction side, then the tire width direction rigidity of the central region of the tread portion can be improved by mounting the tire 21 on a vehicle so that the tire 21 rotates from the first tire circumferential direction side towards the second side, and wear due to input of the side force can be reduced.

In the tire 21 according to this embodiment, the inclined groove 25 is formed from the lug groove 25a and the narrow groove 25b, but the inclined groove 25a may instead be formed from the narrow groove alone or from the lug groove alone as in the tire 11 illustrated in FIG. 4, or may have a different shape. Furthermore, the groove width of each groove and the position of the end of each groove may be changed, as in the tire 1 illustrated in FIGS. 2 and 3.

The foregoing has described embodiments of this disclosure with reference to the drawings. However, the tire of this disclosure is not limited to the aforementioned examples, and any appropriate changes may be made to the tire of this disclosure.

INDUSTRIAL APPLICABILITY

A tire according to this disclosure may suitably be used as a tire, with improved uneven wear resistance, for construction and mining vehicles.

REFERENCE SIGNS LIST 1, 11, 21 Tire
2 Carcass
3 Tread portion
3a Tread rubber
4 Belt
4a, 4b, . . . , 4f First belt, second belt, . . . , sixth belt
4g, 4h, 4i Inner intersecting belt group, intermediate intersecting belt group, outer intersecting belt group
5, 15, 25 Inclined groove
5a, 15a, 25a Lug groove
5b, 25b Narrow groove
5c Inner edge in the tire width direction (of the lug groove)
6, 16, 26 Inter-inclined-groove land portion
6a Kick-in end
6b Kick-out end
7, 27 Circumferential groove
25a1 Lug groove outer portion
25a2 Inclined portion
25a3 Tapered portion
25b1 Narrow groove outer portion
25b2 Narrow groove inner portion
26a Second-side land portion edge
26b First-side land portion edge
28 Center groove
C Tire equatorial plane
E Tread surface edge
R Tire rotation direction
T Tread surface
W Tread half-width
OD Tire outer diameter
DC Rubber gauge

The invention claimed is:

1. A tire with a designated tire rotation direction, the tire comprising:
a plurality of inclined grooves in both halves of a tread surface divided by a tire equatorial plane, the inclined grooves extending inward in a tire width direction from a tread surface edge side, being inclined in an opposite direction from the tire rotation direction, and being aligned in a tire circumferential direction; and
an inter-inclined-groove land portion formed between each pair of inclined grooves that are adjacent in the tire circumferential direction;
wherein along a land portion edge of the inter-inclined-groove land portion on the tire rotation direction side thereof, a point P1 located ¾ of a tread half-width from the tire equatorial plane in the tire width direction is positioned on the tire rotation direction side of a point P2 located ¼ of the tread half-width from the tire equatorial plane in the tire width direction,
wherein an entirety of the land portion edge of the inter-inclined-groove land portion on the tire rotation direction side extends straight from the tread surface edge,
wherein each inclined groove includes a lug groove and a narrow groove,
wherein the lug groove extends from the tread surface edge inward in the tire width direction and terminates before reaching the tire equatorial plane;
wherein the narrow groove extends from an inner edge, in the tire width direction, of the lug groove inward in the tire width direction and terminates before reaching the tire equatorial plane; and
wherein a groove width of each of the lug groove and the narrow groove is constant along an entire length.

2. A tire with a designated tire rotation direction, the tire comprising:
a plurality of inclined grooves in both halves of a tread surface divided by a tire equatorial plane, the inclined grooves extending inward in a tire width direction from a tread surface edge side, being inclined in an opposite direction from the tire rotation direction, and being aligned in a tire circumferential direction; and
an inter-inclined-groove land portion formed between each pair of inclined grooves that are adjacent in the tire circumferential direction;
wherein along a land portion edge of the inter-inclined-groove land portion on the tire rotation direction side thereof, a point P1 located ¾ of a tread half-width from the tire equatorial plane in the tire width direction is positioned on the tire rotation direction side of a point P2 located ¼ of the tread half-width from the tire equatorial plane in the tire width direction, wherein at least a portion of each of the inclined grooves is curved, and wherein each inclined groove extends from the tread surface edge inward in the tire width direction and terminates before reaching the tire equatorial plane.

* * * * *